Patented July 9, 1940

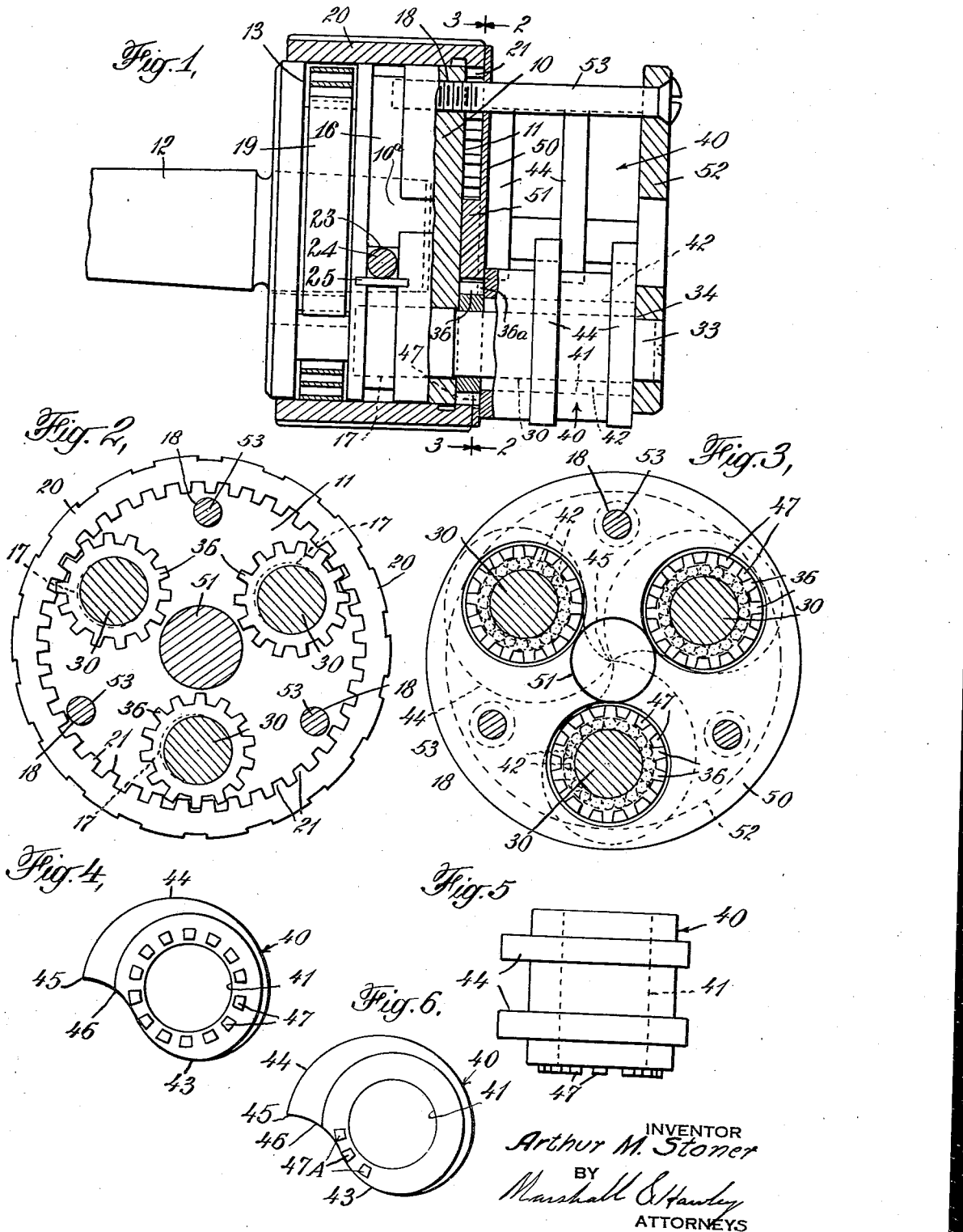

2,207,523

UNITED STATES PATENT OFFICE 2,207,523

CHUCK

Arthur Merrick Stoner, West Hartford, Conn., assignor to The Jacobs Manufacturing Company, Hartford, Conn., a corporation of Connecticut Original application July 8, 1938, Serial No. 218,111. Divided and this application December 5, 1938, Serial No. 243,997

3 Claims. (Cl. 279—33)

This invention relates to improvements in chucks.

Its object is to improve upon chucks of the type having a plurality of rotary tool engaging jaws and to provide a simple and inexpensive arrangement for interconnecting such jaws to cause them to move simultaneously.

This application is a division of application Serial No. 218,111, filed July 8, 1938.

Referring to the drawing:

Fig. 1 is a side elevation partly in section of a chuck which is made according to and embodies my invention;

Fig. 2 is a sectional end elevation of the chuck shown in Fig. 1, the section being taken on the section line of Fig. 1 looking in the direction of the arrows 2—2;

Fig. 3 is a sectional end elevation of the chuck shown in Fig. 1, the section being taken on the section line of Fig. 1 looking in the direction of the arrows 3—3;

Fig. 4 is a rear end view of one of the gripping jaws;

Fig. 5 is a side elevation of the part shown in Fig. 4; and

Fig. 6 is another rear end view of one of the gripping jaws, showing a modified construction.

10 designates the substantially cylindrical body of the chuck having a transverse face 11. 12 is an arbor tapered to fit an axial hole in the body and adapted to fit the driven socket of a machine tool, such as a power drill. 13 is an annular groove near the rear end of the body in which is a spiral spring 19.

Three post holes 17 are drilled into the body from its outer face. These are equally spaced angularly and are at equal distances from the central axis of the body. Between them are tapped holes 18.

20 is a sleeve rotatably supported on the body 10. At its forward end is an internally toothed flange 21 which overlaps the outer face 11 of the body. The ends of the spring 19 are attached to the body 10 and to the sleeve to cause the sleeve to rotate on the body in an anti-clockwise direction as viewed from the front of the chuck (Fig. 2). It may be rotated in the opposite direction by hand, by the operator grasping the outer surface of the sleeve which is fluted as shown, to facilitate such operation.

Posts 30 are fitted into and seated upon the bottoms of the holes 17. The outer end 33 of each post is of reduced diameter and forms a shoulder 34.

Pinions 36 fit the posts 30 rotatively. These are in mesh with the teeth of the flange 21 of sleeve 20. They are of sufficient thickness to extend, when seated on the face 11 of body 10, beyond the flange 21, as shown at 36a in Fig. 1.

40 designates the clamping jaws. These have cylindrical bores 41 which fit the posts 30 with interposed rollers 42. Each jaw has a body with an eccentric portion 43 and spaced eccentric ribs 44, terminating in sharp edges 45 from which they are under-cut on a curve 46 (Fig. 4), back to the body portion 43 which is nearest the axis of the bore 41. The contour of the ribs 44 is alike on all of the jaws, but they are spaced differently on each jaw, as shown in Fig. 1, so that their edges 45 can be moved together to a common axis, as shown in Fig. 3.

From one end of each jaw a row of crown teeth 47 projects. These are concentric with the bore 41 and their outer diameter is somewhat less than that of the body portion 43. When assembled these teeth fit between the parts 36a of the pinion teeth which extend above the rim teeth 21, as shown in Figs. 1 and 3.

Fig. 6 shows a modification in which only three crown teeth 47A are provided. This arrangement has the advantage of being more easily assembled and having less tendency to produce a binding effect if the crown gear teeth are not accurately centered with respect to the bore 41.

50 is a cover plate which is provided with clearance holes for the pinions 36 and the teeth 47. This lies on the front surface of the rim flange in the space between it and the lower ends of the body portions 43 of the clamping jaws. This cover plate may also have a central boss 51 which extends to and rests upon the face 11 of the chuck body 10.

52 is a clamping plate having perforations through which the ends 33 of the adjusting posts extend. This clamping plate rests on the shoulders 34 of the posts. It is held in place by screws 53 which pass through it and into engagement with the threaded holes 17 in the body 10.

The teeth 47 are so positioned in relation to the teeth of pinions 36 that the edges 45 of the ribs 44 of the clamping jaws are approximately in the axis of the body 10 when the sleeve is moved in relation to body 10 by spring 19 to its extreme position. A pin which has a square end 23 and a cylindrical portion 24 is supported by the sleeve. The cylindrical portion 24 extends into a radial hole in the sleeve and its square end moves in an annular slot 16. A longitudinal groove 10A is cut in the surface of the body 10 to permit assemblying. Woodruff keys, such as 25, are set into the body across the groove 16 in the path of movement of the part 23 of the pin to arrest its movement. The extreme inward position of the cams is shown in Fig. 3. The rollers 42 lie between the outer face of the pinions 36 and the inner face of the clamping plate 52.

Another disadvantage of structures of this kind is that when the angularity of the gripping jaws is sufficiently low to produce the necessary grip on the inserted tool, it is difficult to release them. In my structure the roller bearings overcome this difficulty. They do not affect the adjustment of the jaws when they are gripping because the spring 19 exerts an equal pressure upon them. The first effect of turning the sleeve 20 on body 10 to release the tool is not frictionally resisted and its initial movement, which diminishes the gripping pressure and unlocks the jaws, is easily effected.

The chuck can be easily operated while in rotation. A slight pressure of the hand on the sleeve is sufficient to move the jaws from their fully closed position shown in Fig. 3 toward their fully opened position. Then a tool is inserted and the hand released. The spring moves the jaws inwardly and the grip on the tool is instantaneous and self-tightening. If this release of the chuck while in rotation is not desired, the spring may be omitted.

The gripping jaws and their supporting parts are uncovered and are open for inspection. This cage-like construction of the front end of the chuck materially reduces its diameter and increases its utility.

Structural modifications may be made within the spirit and scope of this invention and I intend no limitations other than those imposed by the appended claims.

What I claim is:

1. A chuck comprising a body, a gear rotatively supported by the body, angularly spaced posts extending from one end of the body, pinions rotatively mounted on the posts in mesh with said gear parts of said pinions extending beyond the gear, and gripping jaws rotatively mounted on the posts having means on their ends adjacent the pinions for engaging the extending portions of said pinions.

2. A chuck comprising a body, a sleeve rotatively supported by the body, having an internally toothed flange overlapping the face of the body, angularly spaced posts extending from one end of the body, pinions rotatively mounted on the posts in mesh with but extending beyond the teeth of said flange, gripping jaws rotatively mounted on the posts, and crown gear teeth on the ends of the jaws adjacent the pinions arranged to engage the parts of the teeth of the pinions which extend beyond said flange.

3. A chuck comprising a body, a sleeve rotatively supported by the body having an internally toothed flange overlapping the face of the body, a spring arranged to rotate the sleeve on the body in one direction, a stop arranged to limit the movement of the sleeve on the body, angularly spaced posts extending from one end of the body, pinions rotatively mounted on the posts in mesh with the teeth of the flange, but extending beyond said flange, a cover plate surrounding the pinions and overlapping the flange, gripping jaws rotatively mounted on the posts, projections on the ends of the jaws extending beyond the rollers into engagement with the teeth of the pinions, a clamping plate on the outer ends of the posts attached to said body, and rollers interposed between the posts and jaws extending from the pinions to the clamping plate.

ARTHUR MERRICK STONER.